United States Patent [19]
Stankus et al.

[11] Patent Number: 5,576,043
[45] Date of Patent: Nov. 19, 1996

[54] SHORTENING SUBSTITUTE

[75] Inventors: Carol Stankus, Chicago; David Mauro, Dolton, both of Ill.; Thomas Treece, Florissant, Mo.

[73] Assignee: American Maize-Products Company, Hammond, Ind.

[21] Appl. No.: 478,509

[22] Filed: Jun. 7, 1995

[51] Int. Cl.⁶ .............................. A23L 1/0522; A23D 7/00
[52] U.S. Cl. .................. 426/578; 426/601; 426/603; 426/661; 426/804
[58] Field of Search .................................. 426/578, 661, 426/601, 602, 804, 603

[56] References Cited

U.S. PATENT DOCUMENTS

| | | | |
|---|---|---|---|
| 3,962,465 | 6/1976 | Richter et al. | 426/48 |
| 3,986,890 | 10/1976 | Richter et al. | 127/38 |
| 4,308,294 | 12/1981 | Rispoli et al. | 426/564 |
| 4,510,166 | 4/1985 | Lenchin et al. | 426/565 |
| 4,536,408 | 8/1985 | Morehouse et al. | 426/250 |
| 4,562,086 | 12/1985 | Smolka et al. | 426/578 |
| 4,767,849 | 8/1988 | Friedman et al. | 536/102 |
| 4,789,557 | 12/1988 | Friedman et al. | 426/578 |
| 4,981,709 | 1/1991 | Furcsik et al. | 426/565 |
| 5,034,240 | 7/1991 | Tanaka et al. | 426/607 |
| 5,063,076 | 11/1991 | Finlayson et al. | 426/602 |
| 5,094,872 | 3/1992 | Furcsik et al. | 426/578 |
| 5,154,942 | 10/1992 | Hirschey et al. | 426/572 |
| 5,190,776 | 3/1993 | Baumann | 426/94 |
| 5,208,060 | 5/1993 | Gautchier et al. | 426/556 |
| 5,246,727 | 9/1993 | Finkel | 426/601 |
| 5,308,639 | 5/1994 | Fung | 426/602 |
| 5,395,638 | 3/1995 | Kines et al. | 426/556 |
| 5,512,311 | 4/1996 | Capitani | 426/601 |

*Primary Examiner*—Jeanette Hunter
*Attorney, Agent, or Firm*—Lucas & Just

[57] ABSTRACT

The shortening substitute contains a mixture of 1–10% by weight pregelatinized, unmodified starch; 5–15% by weight pregelatinized, modified high amylopectin starch; 5–10% by weight emulsifier; 5–25% by weight shortening; and a remainder of water. The modified, high amylopectin starch is either a crosslinked, hydroxypropylated starch or a crosslinked, esterified starch, both of which have an amylopectin content of 95% or more. Plasticizer in an amount of 0.1–1% by weight and a maltodextrin in an amount of 1–20% by weight can be incorporated into the mixture. The shortening substitute can be used as a replacement for conventional shortening in a baked good and is especially suited for use as a roll-in shortening for laminated pastries.

20 Claims, No Drawings

SHORTENING SUBSTITUTE

This invention relates to food and, more particularly, to a composition comprising a pregelatinized unmodified starch and a pregelatinized modified high amylopectin starch for use as a shortening substitute in foodstuffs. The shortening substitute of the present invention is especially suited for use in baked goods, and, more specifically, as a roll-in fat substitute for baked goods.

Conventional shortenings are edible fats, either animal or vegetable, which are used primarily in baking to shorten the dough. Butter, margarine, lard and hydrogenated vegetable oil, e.g. CRISCO, are typical shortenings. Roll-in fat materials are a class of shortenings which are used to make laminated baked goods such as danish pastry, puff pastry, and croissants. As such, the roll-in fat material must be capable of being spread into uniform layers when compressed between layers of dough. If the roll-in material is too hard, it will tear the dough, while if it is too soft, it will "soak" into the dough and not form a continuous, uniform layer between layers of dough. Margarine and butter are primarily used as roll-in fat materials.

Consumer demands for low fat foodstuffs has brought about a need in the food industry for fat substitutes with low caloric content. Starch and starch-based compositions have been suggested for such use. For example, various starch hydrolysates have been suggested as fat replacers, see for example, U.S. Pat. No. 5,094,872 issued Mar. 10, 1992; U.S. Pat. No. 4,536,408 issued Aug. 20, 1985; U.S. Pat. No. 4,510,166 issued Apr. 9, 1985; U.S. Pat. No. 3,962,465 issued Jun. 8, 1976; and U.S. Pat. No. 3,986,890 issued Oct. 19, 1976. Also, the use of certain modified starches as fat replacers has been suggested in U.S. Pat. No. 4,981,709 issued Jan. 1, 1991 (non-crosslinked, hydroxypropylated high amylose starch); U.S. Pat. No. 4,562,086 issued Dec. 31, 1985 (hydroxyalkylated, crosslinked non-waxy starch); and U.S. Pat. No. 4,308,294 issued Dec. 29, 1981 (acid stable modified starch such as propylated, crosslinked and acetylated). Additionally, various compositions have been suggested as shortening substitutes, see for example U.S. Pat. No. 5,246,727 issued Sep. 21, 1993 (a mixture of a shortening, a carrier such as starch, and a polyol such as glycerine as a shortening substitute); U.S. Pat. No. 5,208,060 issued May 4, 1993 (a mixture of two edible fats having different solids content, and an emulsifier); U.S. Pat. No. 5,190,776 issued Mar. 2, 1993 (a mixture of cake crumbs, sugar, and a starch based creme filling); U.S. Pat. No. 5,063,076 issued Nov. 5, 1991 (fat emulsifier and protein or a mixture of protein and polysaccharide); and U.S. Pat. No. 5,034,240 issued Jul. 23, 1991 (a mixture of fat or oil, and a solid component such as a starch).

It is important for a roll-in fat substitute to have the proper texture and viscoelastic properties to make it suitable for use in laminated pastries. As noted before, if it is too hard it will tear the dough but if it is too soft it will "soak" into the dough and not form a continuous layer. Thus, not all fat replacers are necessarily suitable for use as a roll-in fat substitute.

A shortening substitute has now been discovered which has reduced fat content and which has the necessary texture to act as a roll-in fat substitute. In fact, the shortening substitute of the present invention has been found, in some instances, to produce a baked good which tastes better than a baked good made with a conventional shortening. Furthermore, the shortening substitute of the present invention has been found to work well in frozen doughs. Additionally, the shortening substitute of the present invention provides a cost savings to the user when compared to a conventional shortening.

Broadly, the shortening substitute of the present invention comprises a mixture of:

(a) about 1 to about 10% by weight pregelatinized, unmodified starch;

(b) about 5 to about 15% by weight pregelatinized, modified, high amylopectin starch, said modified starch being selected from the group consisting of pregelatinized crosslinked, hydroxypropylated high amylopectin starches and pregelatinized, crosslinked, esterified high amylopectin starches;

(c) about 5 to about 10% by weight emulsifier, said emulsifier comprising at least one monoglyceride;

(d) about 5 to about 25% by weight conventional shortening; and (e) a remainder of water, wherein said water content is greater than or equal to about 60% by weight.

In order for the shortening substitute of the present invention to be used as a roll-in fat substitute, it must have the proper texture. Specifically, the roll-in fat substitute of the present invention must possess certain viscoelastic properties.

Specifically, when used as a roll-in fat substitute, the shortening substitute of the present invention must have a Voland value of about 160 to about 1190 load grams when measured with a Voland Texture Analyzer following the procedure in the Operators Manual using a speed of 0.2 mm, a depth of 20.0 mm and the cone probe, TA-15.

Additionally, the shortening substitute of the present invention when used as a roll-in fat substitute should have a water activity of about 0.990 to about 1.000 when measured with a water activity instrument, Aqualab by Decagon using the procedure as outlined in the operator's manual after the material had been refrigerated at 4° C. for 24 hours.

Furthermore, in order for the shortening substitute of the present invention to have the proper texture for use as a roll-in fat substitute, the shortening substitute of the present invention should have a Differential Scanning Calorimetry (DSC) Peak temperature ($T_p$) of about 40° C. to about 55° C. when measured using a scanning calorimeter manufactured by Mettler Model No. 300. $T_p$ is calculated from the thermograms generated by actually weighing about 5 to about 20 milligrams of shortening substitute into a DSC pan, sealing the pan, and heating the sample from 10° C. to 120° C. in the DSC at a rate of 10° C./min.

The pregelatinization of the unmodified starch and the modified starch used in the present invention is accomplished in a conventional manner using conventional equipment. Suitable techniques include drum drying (hot-rolling), extrusion, or spray drying.

The starch used to make the pregelatinized, unmodified starch is obtained from any conventional source such as potato, wheat, rice and maize. Any variety of starch can be used such as a high amylopectin (waxy), common or high amylose. Preferably, the source is maize and the preferred variety is a high amylose starch, or a high amylopectin-starch. The preferred high amylopectin starches are a dull waxy starch and a waxy starch. Preferably, the high amylose starch is pregelatinized by means of extrusion while the high amylopectin starches are pregelatinized by means of drum drying. Good results have been obtained with pregelatinized unmodified dull waxy corn starch prepared by drum drying. The pregelatinized starches are unmodified except for the physical treatment to which a slurry of starch granules are subjected in order to make them pregelatinized.

The amount of pregelatinized, unmodified starch used in the shortening substitute of the present invention is about 1 to about 10% by Weight of said mixture, and preferably about 2 to about 8% by weight. It is more preferred to use about 5% by weight of said pregelatinized unmodified starch in said mixture.

Starch is made up of two polymers of anhydroglucose, amylose and amylopectin. Amylose is essentially a polymer of anhydroglucose monomers bonded together by alpha 1–4 bonds; while amylopectin is essentially a polymer of anhydroglucose bonded together by both alpha 1–4 bonds and some alpha 1–6 bonds. The term "high amylose starch" as used in the specification and claims mean that the starch has an apparent amylose content of about 40% and above when measured by the Iodine binding technique. More specifically, the high amylose starch has an amylose content of preferably about 45% to about 75%. More preferably, the amylose content is about 50%. The term "high amylopectin starch" as used in the specification and claims mean that the starch has an amylopectin content of about 95% and above when measured by the Iodine binding technique. More preferably, the high amylopectin starch has an amylopectin content of about 99% and above. The combined amylose and amylopectin contents add up to 100%.

The pregelatinized, modified high amylopectin starch used in the present invention is a chemically modified high amylopectin starch. The high amylopectin starch can be obtained from any plant source, for example, rice, maize and barley. Corn starch is preferred. Suitable varieties of high amylopectin starches include waxy starch, dull waxy starch and waxy shrunken 1 starch. The preferred starch for use in making the pregelatinized, modified, high amylopectin starch is waxy corn starch and dull waxy corn starch.

The amount of pregelatinized, modified starch used in the present invention is about 5 to about 15% by weight of said mixture and, more preferably, about 10% by weight.

The chemical modification is either a crosslinked, hydroxypropylated starch or a crosslinked, esterified starch.

In order to make the hydroxypropylated, crosslinked starch, conventional procedures are employed using conventional equipment. The amount of the propylene oxide on the starch is preferably about 2 to about 4.5% and, more preferably, about 2.5%. The degree of substitution (DS) of the hydroxypropylated, crosslinked starch is about 0.056 to about 0.129 and, more preferably, about 0.060 to about 0.080. Good results have been obtained with a DS of about 0.070. For example, in order to etherify the high amylopectin starch, a slurry of starch is made up having about 5 to about 40% by weight starch. The pH of the slurry is adjusted to about 10 to about 12, preferably with sodium hydroxide. Next, the etherification agent, propylene oxide, is added to the slurry in an amount of about 4 to about 10% depending on the desired degree of substitution.

In order to make the esterified starch, a conventional esterification reaction is run with a suitable esterification agent such as an acetic anhydride or succinic anhydride. For example, in order to esterify the high amylopectin starch, a slurry of starch is prepared having about 5 to about 40% by weight starch. The pH of the slurry is then adjusted to about 8 to about 10 and an esterification agent is added to the slurry. The esterification agent is added slowly while maintaining the pH of the slurry. The reaction is controlled for about 0.5 to about 5 hours at about 30° to about 50° C. Once the reaction is completed to the desired degree of substitution, the slurry is neutralized, dewatered, washed and dried. With respect to acetic anhydride, the add on level has a maximum of about 2.5%.

In order to crosslink either the hydroxypropylated or the esterified starch, a conventional method using conventional equipment is employed. Suitable crosslinking agents include adipic acetic mixed anhydride, phosphorous oxychloride, sodium trimetaphosphates and epichlorohydrin. Preferably phosphorous oxychloride is used to a level of about 0.02 to about 0.08% and, more preferably, about 0.035 to about 0.065%. For example, in order to crosslink the high amylopectin starch, a slurry of starch is made up of about 5 to about 40% by weight starch. The pH of the slurry is adjusted to about 8 to about 12, preferably with sodium hydroxide. Optionally, a salt may be added to the slurry to inhibit swelling of the granules. Then the slurry is reacted with a crosslinking agent at about 20° to about 50° C. for about 0.5 to about 5 hours. The length of time of the reaction will depend on the amount of crosslinking agent used, the specific crosslinking agent chosen, and the reaction conditions.

The order of reaction, etherified then crosslinked or crosslinked then etherified is not critical so long as the two are balanced to provide the proper rheological properties of the chemically modified starch. This is also true for the crosslinked esterified starch. The pregelatinization of the modified, high amylopectin starches are conducted after the starch has been fully modified.

The terms "waxy shrunken 1 starch" and "dull waxy starch" as used in the specification and claims mean starch obtained from starch-bearing plants which are of the waxy shrunken 1 or dull waxy genotypes, respectively. The terms "waxy shrunken 1" or "dull waxy" genotype as used in the specification and claims mean not only the homozygous genotype, which has been obtained by standard plant breeding techniques, but also the genotype which has been moved to another portion of the plant genome by translocation, inversion, or any other method of chromosome engineering to include variations thereof whereby the properties of the starch used in the present invention are obtained.

U.S. Pat. No. 4,789,557 issued Dec. 6, 1988 discloses the dull waxy starch and its use in food, while U.S. Pat. No. 4,767,849 issued Aug. 30, 1988 discloses waxy shrunken 1 starch and its use in foodstuffs. These patents are incorporated herein by reference.

Any plant source which produces edible starch and which can be crossbred to produce a plant having a waxy shrunken 1 or a dull waxy genotype may be used to obtain the starches which are used in accordance with the present invention.

The emulsifier used in the present invention is at least one monoglyceride or derivative thereof. More preferably, it is a combination of mono- and di-glycerides, and even more preferred is a combination of mono-, di-, and polyglycerides. The amount of emulsifier used is about 5 to about 10% by weight of mixture, and preferably about 7 to about 8.5% by weight.

The amount of shortening used is about 5 to about 25% by weight mixture and preferably about 10 to about 20% by weight. More preferably, the amount of the shortening used is about 16% by weight. Any conventional shortening can be used, either animal or vegetable based shortening. Preferably a vegetable based shortening is employed and, more preferably, a cotton seed/soybean-based shortening is employed.

The amount of water in the formulation is greater than or equal to about 60% by weight of the mixture and, more preferably, about 70% by weight. Naturally, the water must be potable. The amount of water makes up the remainder of the formulation.

Preferably, a plasticizer is employed in the present invention in an amount up to about 1% by weight of the mixture and, more preferably, in an amount of about 0.1 to about 1% by weight. The most preferred amount of plasticizer employed is about 0.5% by weight. Any food grade plasticizer can be employed such as sorbitol, maltitol, propylene glycol, and glycerine. Good results have been obtained with glycerine.

A maltodextrin can be employed in the present invention in an amount up to about.20% and, more preferably, in an amount of about 1% to about 20% by weight of said mixture. More preferably, the maltodextrin is present in an amount of about 10% by weight. The use of the maltodextrin in the mixture reduces the time of the aging process.

Suitable maltodextrins for use in the present invention are prepared in a conventional manner using conventional equipment. Preferably an all-enzyme process is used to make the maltodextrin employed in the present invention. The maltodextrin should have a dextrose equivalent (DE) when measured by the Lane-Eynon method of about 1 to 20 and, more preferably, of about 10. Any base starch can be used to prepare the maltodextrin, however, good results have been obtained with a waxy corn starch. For example, in order to make a maltodextrin by means of enzyme treatment, a slurry of starch is made up having about 5 to about 40% by weight starch. To this slurry, enzyme is added at the optimum pH and temperature for the enzyme. Some advantage is found by first jet cooking the slurry to open up the starch granules, cooling the slurry to optimum temperature for the enzyme and then adding the enzyme. If the enzyme is a high temperature stable enzyme, then it can be added to the slurry prior to jet cooking. The slurry may also be treated with acid first to a low DE and then enzyme treated. After enzyme treatment, the product is dewatered and dried. Alternatively, the product may be subject to conventional carbon bleaching and filtration prior to concentration and/or drying.

In order to make the shortening substitute of the present invention, all the ingredients are mixed together using conventional equipment to form a uniform blend. More preferably a homogenizer is used to more thoroughly mix the components. When the components are mixed, an oil-in-water type emulsion is formed.

After mixing, it is preferred to age the mixture in a refrigerator at a temperature of about 2° to about 5° C. and, more preferably, about 4° C. for a period of at least about 4 hours and, more preferably, for a period of about 8 hours or more. Good results have been obtained after aging the mixture in the refrigerator for a period of about 12 hours.

The refrigeration process aids in obtaining the proper viscoelastic properties of the mixture.

Replacing the shortening in a foodstuff is accomplished by substituting, on a 1:1 weight basis, the shortening substitute of the present invention for the shortening used to formulate the foodstuff. All or a portion of the conventional shortening in the foodstuff can be replaced with the shortening substitute of the present invention. The shortening substitute of the present invention is especially useful in preparing doughs for making a baked good such as croissants, danishes, pie crusts, cookies, cakes and the like. It has also been found to work well as a roll-in fat replacer in puff pastries and danishes.

A reduction in the caloric content of the foodstuff is accomplished because conventional shortening has a caloric content of about 9 calories per gram while the caloric content of the shortening substitute of the present invention is about 2 calories per gram. This means that a foodstuff made with the shortening substitute of the present invention wherein all the shortening has been replaced with the shortening substitute of the present invention has reduced its caloric content from shortening by about 75%, presuming no other changes to the formulation except the replacement of the conventional shortening by the shortening substitute of the present invention.

The shortening substitute of the present invention can be used not only as a shortening substitute in baked goods but also in other foodstuffs such as candies, icings and the like where shortening is used in formulating the foodstuff.

These and other aspects of the present invention may be more fully understood by reference to one or more of the following examples.

EXAMPLE 1

This example illustrates making three shortening substitutes in accordance with, the present invention. Table I below lists the proportions of each of the components used to make the different shortening replacers.

TABLE I

| Components | Percent By Weight | | |
|---|---|---|---|
| | A | B | C |
| Modified Starch | 9 | 11.57 | 14.14 |
| Unmodified Starch | 5 | 6.43 | 7.86 |
| Emulsifiers | 8 | 6 | 4 |
| Plasticizers | 0.5 | 0.5 | 0.5 |
| Shortening | 8 | 6 | 4 |
| Water | 69.5 | 69.5 | 69.5 |

The modified starch was a pregelled crosslinked, hydroxypropylated dull waxy corn starch having a crosslinking of 0.035% with phosphorous oxychloride and a degree of substitution of 0.070 (2.5% on starch) with hydroxypropyl groups. Such a starch is commercially available under the mark AMERIMAIZE 2215 from American Maize-Products Company. The unmodified starch was a pregelled dull waxy corn starch sold under the mark AMERIMAIZE 2210 by American Maize-Products Company.

Two emulsifiers were used, Durem® 204 which is a combination of mono and diglycerides and Santone® 3-1-S which is a polyglycerol ester of a fatty acid. Formulation A contained 6.4% Durem® 204 and 1.6% Santone® 3-1-S; Formulation B contained 4.8% Durem® 204 and 1.2% Santone® 3-1-S; and Formulation C contained 3.2% Durem® 204 and 0.8% Santone® 3-1-S.

The shortening employed was a cottonseed/soybean all-purpose baking shortening. The plasticizer employed was glycerine.

In order to formulate each of the shortening substitutes, the water was placed in a mixer and the two starches, after being preblended, were mixed into the water. The starch and water mixture was allowed to stand for 15 minutes to fully hydrate the starch. Next, the shortening and emulsifiers were combined and melted to a liquid. Then the liquid was mixed into the hydrated starch and glycerine was added. A uniform oil-in-water emulsion was formed by mixing and this emulsion was placed in the refrigerator (4° C.) for 12 hours.

EXAMPLE 2

This example illustrates making up three shortening substitutes in accordance with the present invention.

The same three formulations as shown in Table I and the same ingredients as used in Example 1 were used, except: (1) the modified starch was a pregelatinized, crosslinked, hydroxypropylated waxy corn starch with a propylene oxide level of 3 to 4.5% and a crosslinked level of 0.05 to 0.065%; and (2) the unmodified starch was an extruded, high amylose (50%) corn starch. The shortening substitute was made in accordance with the procedure of Example 1 above.

EXAMPLE 3

This example illustrates making up three shortening substitutes in accordance with the present invention.

The same three formulations as shown in Table I and the same ingredients as used in Example 1 were used, except: the modified starch was a pregelatinized, crosslinked, hydroxypropylated waxy corn starch with a propylene oxide level of 3 to 4.5% and a crosslinked level of 0.05 to 0.065%. The shortening substitute was made in accordance with the procedure of Example 1 above.

EXAMPLE 4

This example illustrates making up three shortening substitutes in accordance with the present invention.

The same three formulations as shown in Table I and the same ingredients as used in Example 1 were used, except: (1) the modified starch was a pregelatinized, crosslinked, hydroxypropylated waxy corn starch with a propylene oxide level of 3 to 4.5% and a crosslinked level of 0.05 to 0.065%; (2) the water content was lowered to 59.5%; and (3) 10% of a maltodextrin (DE 10) made from a waxy corn starch was added such that the formulation still added up to 100%. The shortening substitute was made in accordance with the procedure of Example 1 above.

EXAMPLE 5

This example illustrates making up three shortening substitutes in accordance with the present invention.

The same three formulations as shown in Table I and the same ingredients as used in Example 1 were used, except: the unmodified starch was an extruded, high amylose (50%) corn starch. The shortening substitute was made in accordance with the procedure of Example 1 above.

EXAMPLE 6

This example illustrates making up three shortening substitutes in accordance with the present invention.

The same three formulations as shown in Table I and the same ingredients as used in Example 1 were used, except: (1) the water level was lowered to 59.3%; and (2) 10% of a maltodextrin (10 DE) made from a waxy corn starch was added such that the formulation still added up to 100%. The shortening substitute was made in accordance with the procedure of Example 1 above.

EXAMPLE 7

This example illustrates using the shortening substitute of Formulation B from Examples 1–6 above as a roll-in fat substitute to make a danish. Six doughs/danishes were made, one per formulation, and Table II below lists the ingredients used to make both the dough and the laminated baked good.

TABLE II

| Ingredients | % By Weight |
| --- | --- |
| Danish Dough | |
| Water (45° F.) | 22.21 |
| Sugar | 8.64 |
| Active dry yeast | 3.21 |
| All purpose shortening | 7.19 |
| Salt | 0.96 |
| Non-fat dry milk | 2.88 |
| Whole eggs | 5.76 |
| All purpose flour | 23.98 |
| Flour | 23.98 |
| Nutmeg | 0.132 |
| Lemon flavor | 0.40 |
| Vanilla flavor | 0.66 |
| | 100.00 |
| Danish | |
| Dough | 83.00 |
| Roll-In (Shortening Substitute of Present Invention) | 17.00 |
| | 100.00 |

First, all the dough ingredients were mixed, spread evenly on floured pans and then refrigerated at 4° C. for approximately 1 hour. Then, using each of the formulations, a danish was made in a conventional way and baked at 350° F. (177° C.) for 10 minutes.

The danish made in accordance with this example was taste tested against a danish made in an identical manner using a conventional roll-in, partially hydrogenated vegetable margarine. The two danishes could not be distinguished by the taste panel and, in some instances, the taste panel thought that the danish made with the shortening substitute of the present invention tasted better than the danish made with conventional shortening.

EXAMPLE 8

This example illustrates using the shortening substitute of Formulation B from Examples 1–6 above as a roll-in fat substitute and as a shortening substitute for all of the shortening in the dough in a danish. Six doughs/danishes were made, one per formulation. Table II of Example 7 lists the ingredients used to make both the dough and the danish, except that all of the all purpose shortening used to make the dough was replaced with the same shortening substitute used as the roll-in fat substitute. The same procedure as outlined in Example 7 above was used to make the dough and the danish. This danish was comparable to a conventional danish made with conventional shortening.

EXAMPLE 9

This example illustrates using the shortening substitute of Formulation B from Examples 1–6 above as a roll-in fat substitute and as a shortening substitute for half of the shortening in the dough of the danish. Six doughs/danishes were made, one per formulation. Table II of Example 7 lists the ingredients used to make both the dough and the danish. The same procedure as outlined in Example 7 above was used to make the dough and the danish. This danish was comparable to a conventional danish made with conventional shortening.

EXAMPLE 10

This example illustrates using Formulation A of Examples 1–6 above to make a pie crust. Six pie crusts, one per formulation, were made using the ingredients recited in Table III below.

TABLE III

| Ingredients | % By Weight |
| --- | --- |
| Flour | 55.63 |
| Shortening | 13.32 |
| Shortening Substitute of the Present Invention | 13.32 |
| Salt | 0.59 |
| Water | 17.14 |
| | 100.00 |

In order to make the pie crust, all the ingredients were mixed and formed into a pie crust which was baked at 340° F. (172° C.) for approximately 18 minutes.

An acceptable pie crust was made.

EXAMPLE 11

This example illustrates using the shortening substitute of the present invention to make a chocolate chip cookie. Following the conventional recipe listed in Table IV below (control), three batches of chocolate chip cookies were made, one following the formula listed below, one with half the shortening replaced with the shortening substitute of Formulation A of Example 1 above, and the other batch was made by replacing all the shortening with Formulation A of Example 1 above.

TABLE IV

| Ingredients | % By Weight |
| --- | --- |
| All purpose flour | 18.43 |
| Baking soda | 0.18 |
| Flour salt | 0.18 |
| All purpose shortening | 20.93 |
| Granulated sugar | 17.20 |
| Brown sugar | 17.93 |
| Vanilla | 0.15 |
| Whole egg | 5.80 |
| Chocolate chips | 19.20 |
| | 100.00 |

In order to make the cookies, the ingredients were mixed and then baked at 350° F. (171° C.) for approximately 10 minutes.

The cookies made were comparable to the conventional cookies.

EXAMPLE 12

This example compares the Voland value of the shortening substitute of the present invention with the Voland value for a conventional all-purpose shortening and baker's margarine. Table V, below, lists the Voland data for the shortening substitutes of Formulation A, B and C made in Examples 1–6 above compared to a conventional all purpose shortening and baker's margarine.

TABLE V

| | Formulation | | |
| --- | --- | --- | --- |
| Example | A | B | C |
| 1 | 428 | 377 | 168 |
| 2 | 171 | 176 | 207 |
| 3 | 402 | 280 | 200 |
| 4 | 531 | 504 | 1145 |
| 5 | 153 | 243 | 227 |
| 6 | 627 | 606 | 1182 |
| Conventional Shortening | 720 | | |
| Baker's Margarine | 660 | | |

These Voland values were measured with a Voland Texture Analyzer following the procedure in the Operator's Manual using a speed of 0.2 mm, a depth of 20.0 mm and the cone probe, TA-15. The measurements are in load grams.

It should be noted that all of these measurements were made after the material had been refrigerated at 4° C. overnight and then allowed to come to around room temperature for the baker's margarine and conventional shortening while the shortening substitute of the present invention was measured at temperatures between 5.6° C. and 12.8° C. The Voland measurements for the shortening substitute of the present invention was the average of three separate measurements.

Voland values measure the firmness of the shortening substitutes and demonstrate that the shortening substitute of the present invention has a firmness comparable to conventional materials used as a roll-in fat.

EXAMPLE 13

This example compares the water activity of the shortening substitute of the present invention with the water activity for a conventional all-purpose shortening and a baker's margarine. Table VI below lists the water activity for the shortening substitute of Formulation A, B and C made in Examples 1–6 above compared to a conventional shortening and baker's margarine.

TABLE VI

| | Formulation | | |
| --- | --- | --- | --- |
| Example | A | B | C |
| 1 | 0.999 | 1.000 | 1.000 |
| 2 | 1.000 | 0.998 | 1.000 |
| 3 | 0.999 | 0.998 | 1.000 |
| 4 | 0.997 | 0.996 | 1.000 |
| 5 | 1.000 | 1.000 | 1.000 |
| 6 | 0.992 | 0.995 | 1.000 |
| Conventional all-purpose shortening: | 0.250 | | |
| Baker's Margarine: | 0.812 | | |

These water activity measurements were measured using an Aqualab manufactured by Decagon following the procedure outlined in the operator's manual after the material had been refrigerated at 4° C. for 24 hours. The samples were removed from the refrigerator and allowed to come to room temperature (19°–25° C.) prior to measurement.

EXAMPLE 14

This example illustrates making a white cake using the shortening substitute of the present invention. Table VII below lists the formulation used to make the white cake.

TABLE VII

| Ingredients | Grams |
| --- | --- |
| Cake Flour | 240 |
| Bread Flour | 120 |
| Shortening substitute | 165 |
| Sugar, fine granular | 420 |
| Whole eggs | 255 |
| Whole milk | 270.0 |
| Baking powder | 21.0 |
| Salt | 7.5 |
| Vanilla, liquid | 1.5 |
| Pregelatinized starch | 18.0 |
| Water | 68.0 |

In order to prepare the cake, the shortening and sugar were creamed together and then the eggs were added. The dry ingredients were mixed together and then added in. Then the remaining ingredients were added and the batter poured into cake pans and baked at 175° C. until done.

The specific gravity of the cake batter made with the shortening of the present invention was 0.916, while a high fat control cake batter had a specific gravity of 0.796.

The cake batter made with the shortening substitute of the present invention produced a very good cake.

It will be understood that the claims are intended to cover all changes and modifications of the preferred embodiments of the invention herein chosen for the purpose of illustration which do not constitute a departure from the spirit and scope of the invention.

What is claimed is:

1. A shortening substitute comprising a mixture of:
   (a) about 1 to about 10% by weight pregelatinized, unmodified starch;
   (b) about 5 to about 15% by weight pregelatinized, modified, high amylopectin starch, said modified starch being selected from the group consisting of pregelatinized, crosslinked, hydroxypropylated starch and pregelatinized, crosslinked, esterified starch;

(c) about 5 to about 10% by weight emulsifier, said emulsifier comprising at least a monoglyceride;

(d) about 5 to about 25% by weight shortening; and (e) a remainder of water, wherein said water content is greater than or equal to about 60% by weight.

2. The mixture of claim 1 wherein said pregelatinized unmodified starch is selected from the group consisting of a pregelatinized high amylose starch, a pregelatinized high amylopectin starch.

3. The mixture of claim 1 or 2 wherein said pregelatinized modified high amylopectin starch is selected from the group consisting of pregelatinized, crosslinked, hydroxypropylated waxy starch, pregelatinized, crosslinked, hydroxypropylated dull waxy starch and pregelatinized, crosslinked, hydroxypropylated waxy shrunken 1 starch.

4. The mixture of claim 1 wherein the emulsifier is a combination of monoglycerides, diglycerides and polyglycerides.

5. The mixture of claim 1 wherein the shortening is a hydrogenated vegetable shortening.

6. The mixture of claim 1 wherein said mixture further comprises about 0.1 to about 1% by weight plasticizer.

7. The mixture of claim 1 wherein said mixture further comprises about 1 to about 20% by weight maltodextrin having a dextrose equivalent of about 1 to about 20.

8. The mixture of claim 1 wherein said mixture has a Voland Texture Value of about 160 to about 1190 load grams.

9. A shortening substitute consisting essentially of a mixture of:

(a) about 1 to about 10% by weight pregelatinized, unmodified starch;

(b) about 5 to about 15% by weight pregelatinized, modified, high amylopectin starch, said modified starch being selected from the group consisting of pregelatinized, crosslinked, hydroxypropylated starch and pregelatinized, crosslinked, esterified starch;

(c) about 5 to about 10% by weight emulsifier, said emulsifier comprising at least a monoglyceride;

(d) about 5 to about 25% by weight shortening;

(e) up to about 1% by weight plasticizer;

(f) up to about 20% by weight maltodextrin, said maltodextrin having a dextrose equivalent of about 1 to about 20; and (g) a remainder of water, wherein said water content is greater than or equal to about 60% by weight.

10. A process for making a shortening substitute comprising the steps of:

I) forming a mixture comprising:
(a) about 1 to about 10% by weight pregelatinized, unmodified starch;
(b) about 5 to about 15% by weight pregelatinized, modified, high amylopectin starch, said modified starch being selected from the group consisting of pregelatinized, crosslinked, hydroxypropylated starch and pregelatinized, crosslinked, esterified starch;
(c) about 5 to about 10% by weight emulsifier, said emulsifier comprising at least a monoglyceride;
(d) about 5 to about 25% by weight shortening; and
(e) a remainder of water, wherein said water content is greater than or equal to about 60% by weight; and II) aging said mixture in a refrigerator at a temperature of about 2° C. to about 5° C. for a period of at least about 4 hours to form a hardened mass for use as a shortening substitute.

11. The process of claim 10 wherein said aging is conducted at a temperature of about 4° C. for a period of about 8 hours or more.

12. The process of claim 10 wherein said mixture is formed by homogenizing said mixture to form a homogeneous blend.

13. A process for making a reduced fat foodstuff, wherein said foodstuff comprises shortening, said process comprising the steps of replacing at least a portion of the shortening used to make the foodstuff with a mixture comprising:

(a) about 1 to about 10% by weight pregelatinized, unmodified starch;

(b) about 5 to about 15% by weight pregelatinized, modified, high amylopectin starch, said modified starch being selected from the group consisting of pregelatinized, crosslinked, hydroxypropylated starch and pregelatinized, crosslinked, esterified starch;

(c) about 5 to about 10% by weight emulsifier, said emulsifier comprising at least a monoglyceride;

(d) about 5 to about 25% by weight shortening; and (e) a remainder of water, wherein said water content is greater than or equal to about 60% by weight.

14. The method of claim 13 wherein said shortening is replaced by said mixture in a weight ratio of about 1:1.

15. The method of claim 13 wherein the foodstuff is a baked good.

16. The method of claim 15 wherein said baked good is a laminated pastry and made with a roll-in shortening and said mixture is used to replace all of said roll-in shortening.

17. A reduced fat foodstuff made by the process of claim 13.

18. A reduced fat baked good made by the process of claim 15.

19. The reduced fat foodstuff of claim 17 wherein said foodstuff is selected from the group consisting of a baked good, a candy, and icing.

20. The reduced fat baked good of claim 18 wherein said baked good is selected from the group consisting of danish, pie crust, cake and cookies.

* * * * *